UNITED STATES PATENT OFFICE 2,676,906

LIPASE PREPARATIONS

William Gordon Rose, Berkeley, Calif., and Arnold Kent Balls, West Lafayette, Ind., assignors to the United States of America as represented by the Secretary of Agriculture No Drawing. Application December 17, 1951,
Serial No. 262,162

2 Claims. (Cl. 195—66)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of lipase preparations or concentrates which exhibit a high degree of lipolytic activity as compared with the initial biological material used as the starting material. In particular the invention concerns the production of such highly active lipase preparations in cream or in dry powder form from the castor bean (*Ricinus communis*). Another aspect of the invention concerns the use of the highly active lipase preparations to effect a partial hydrolysis of glyceride oils whereby to obtain products containing useful proportions of partial glycerides, that is, mono- and di-glycerides. Another object of the invention concerns the use of the lipase preparations to effect a synthesis of partial glycerides from a fatty acid and glycerol. Further objects of the invention will be obvious from the description herein.

It is well known in the art that castor beans contain lipase. Several techniques have been advocated for preparing lipase concentrates from this raw material; however, these methods are not completely satisfactory because the results are not consistent and often the lipase is inactivated totally or its activity is greatly reduced by the extractive manipulations involved. We have now found that if the castor beans are processed as hereinafter described the lipase concentrates are obtained consistently with a very high degree of lipolytic activity. In accordance with this invention, the following techniques are employed:

The castor beans are first ground with water to make a paste. This paste is then mixed with water to form a preparation of milk-like consistency and allowed to age for at least several hours. This aging is important as it enables certain autolytic reactions to proceed whereby the lipase preparation is enhanced in lipolytic activity as compared with a product made from the un-aged milk. The aging is usually carried out at a cool temperature to prevent microbial spoilage, i. e., 2° to 10° C. and for a period from 2 to 12 hours. Usually for convenience the milk is aged overnight.

The pH of the milk is then adjusted to a range from 4 to 5 by addition of an acid such as hydrochloric, sulphuric, phosphoric, acetic, etc. Preferably at this point a suitable buffer such as potassium acid phthalate or an alkali metal hydrogen phosphate or citrate is added to maintain the pH in the desired range. The adjustment of the pH to the stated range is a critical factor to obtain a high potency product. Thus preparations using pH's of 3.5 and 6 have only $\frac{1}{2}$ and $\frac{1}{20}$, respectively, the activity of those prepared at pH 4.25.

The pH-adjusted product is then subjected to centrifugation to isolate the lipase cream which is washed several times with distilled water and re-centrifuged. This lipase cream is very high in lipolytic activity and serves as a useful material for carrying out various hydrolytic processes as hereinafter described. The cream is subject to mold growth and hence must be kept in cold storage (2°–4° C.), under such conditions that it retains high activity for several months.

To prepare a more stable product the lipase cream is dried an de-fatted. To prevent inactivation, several precautions must be taken: (1) the temperature must not be above 30° C., (2) if all the fat is to be removed from the preparation, the water must be first completely removed before removal of all the fat since the lipase is inactivated by water if no fat is present. A suitable method of preparing the dried powder is to first remove water by lyophilization—that is, freezing the material and subjecting it to vacuum while frozen to remove all the water. As an alternative, the cream may be refluxed under reduced pressure with an organic solvent which boils at 30° C. or less (at the reduced pressure) such as hexane, heptane, petroleum ether, etc. In this process the overhead vapors are condensed and allowed to settle, the water phase is separated and the solvent phase is re-circulated to the distilling vessel. The distillation is continued until no more water vapor comes over with the overhead—this type of drying is sometimes referred to as "azeotropic drying." The dried material, however produced, is then extracted several times with a fat solvent such as hexane, heptane, or petroleum ether to remove the fat. The resulting dry, defatted lipase can be stored for long periods at room temperature without loss of activity. Samples have been stored, for example, for a year with virtually no diminution of lipolytic activity. It is to be noted that since this product is fat-free, it will be inactivated by contact with water. Hence it must be kept in sealed containers and when applied to a reaction it must first be mixed with the glyceride reactant before it is contacted with water.

The lipase concentrates of this invention have many applications. Thus they may be used to synthesize glycerides by contacting them with fatty acids (or partial glycerides) and glycerol. Further, they may be used for total or partial hydrolysis of triglycerides, that is, naturally occurring fats or oils, thus to produce fatty acids or mixtures of fatty acids, mono- and di-glycerides. The latter reaction is probably their most significant use. Thus in the preparation of shortenings it is necessary that they contain a small proportion (1–5%) of mono- and di-glycerides which act as emulsifiers and thus enable the shortening to mix (cream) more thoroughly and rapidly with the various constituents, particularly to blend the flour, water and fat in the preparation of bakery products. In preparing margarine, the fat stock must also contain mono- and di-glycerides so that the fat will emulsify properly with the non-fat milk solids and other non-fatty flavoring and/or nutritive constituents of the margarine. The advantages of using our lipase preparations for preparing partial glycerides are manifold. In the first place, no high temperatures are necessary as required by the known chemical methods involving reaction of the fat and glycerine with a chemical catalyst, e. g., trisodium phosphate. Our process operates eminently satisfactorily at room temperatures thus eliminating need for expensive steam jacketed autoclaves and minimizing degradation and development of off-flavors and dark colors. Secondly, the degree of hydrolysis, that is, the proportion of mono- and di-glycerides is readily controlled by adding measured amounts of water to the reaction. The proportion of partial hydrolytic products with any one fat is solely dependent on the amount of water present in the reaction mixture.

Third, the proportion of the partial hydrolytic products is independent of the amount of lipase preparation used. Thus the amount of lipase only influence the speed of the reaction but not the identity or proportion of the end products. This means that the lipase preparation need not be accurately standardized to obtain reproducible results. Another advantage of our process is that the partial hydrolysis is conducted in a concentrated system containing virtually only the desired materials and little extraneous matter. Thus the major component of the reaction system is the fat, the other reactants, lipase and water, are used in very small proportion. This means that the equipment used for carrying out the process can be small in contrast to procedures wherein the active reactants have to be diluted with large quantities of water or other media. Stemming from this same fact is the advantage that the recovery of the product is also simplified. Thus after the reaction is complete the system contains unreacted fat, mono- and di-glycerides, and lipase—essentially all the added water is used up in the reaction. Thus the mixture need only be heated to inactivate the enzymes—filtered to remove the inactivated enzyme and other suspended matter—and it is ready to be used for addition to shortening or to margarine fat stock. Such simple recovery is to be contrasted with systems wherein large quantities of water are employed which must be separated from the product or systems wherein chemical catalysts such as trisodium phosphate, tin hydroxide, etc. are used which of course must be removed after the reaction to make the product useful.

Studies have been made heretofore on the hydrolysis of fats with lipase preparations. However in these processes the lipases were applied to a system of an emulsion of oil in water and containing a minor amount of oil and a major amount of water. In these experiments about 100 to 1000 times as much water was used as necessary for the theoretical hydrolysis. Thus 54 grams of water is theoretically required to hydrolyze 900 grams of oil, yet in these prior procedures the water was employed in a ratio of 5,400 to 54,000 g. per 900 grams of oil. In such a system controlled hydrolysis, that is, preparation of partial glycerides, is impossible because the hydrolysis is complete to yield glycerol and free fatty acids. Further, the system requires extremely large equipment and the product must then be separated from the excess of water. Another point is that catalytic reactions are notoriously unpredictable and no one could have foretold that the present lipase preparations could operate in a system which is virtually all fat with but a minor proportion of water present. Virtually all enzyme reactions are conducted in extremely dilute solution yet we have found that the instant lipase preparations are remarkably effective in a highly concentrated system.

In conducting a partial hydrolysis in accordance with this invention it is only necessary to commingle the required reagents—fat, lipase preparation and water—forming a water-in-oil emulsion and allow the mixture to react until equilibrium is substantially attained. The expression "fat" is used in the specification and claims herein to mean a tri-glyceride of a fatty acid and includes the normally solid materials such as lard, tallow, hydrogenated vegetable oils and also the normally liquid materials such as olive oil, cottonseed oil, soybean oil, peanut oil, etc.

When using the lipase cream preparation, the reactants can be mixed in any order. However, in the case of the dry, de-fatted powder, this must first be incorporated with the fat or part of the fat prior to contact with water thus to avoid inactivation of the lipase.

The hydrolysis reaction is usually carried out at room temperature for convenience. To increase the rate of reaction higher temperatures may be used to about 35° C., Since temperatures below room temperature decrease the reaction rate, we prefer in general to use a temperature in the range of about 20 to 35° C.

When applying the process to a normally solid fat, it is preferable to first melt the solid material and then cool it to the above temperature range before incorporating the lipase. Most normally solid fats form a supercooled liquid state so that it is possible to have them in a liquid state and still at the desired low temperature whereby the enzyme can be added without danger of inactivation. If the fat solidifies after incorporation of the enzyme and water, no harm is done—the reaction takes place just the same.

The amount of water added to the reaction mixture is important as it controls the extent of hydrolysis. Thus the more water is added the greater the degree of hydrolysis obtained. Thus in a typical instance, by increasing the amount of water from 1.25 g. to 2.24 g. per 50 g. olive oil, the amount of oil hydrolyzed was increased from 65% to 75%. Further by controlling the proportion of water, the relative proportion of fatty acids to partial glycerides (mono- and di-glycerides) can be varied as desired. Thus with olive oil, a proportion of 1.25 g. of water per 50 g. oil yields 32.2% free fatty acids and 33.1% partial glycerides whereas 1.92 g. of water per 50 g. oil yields 42.2% free fatty acids and 19.3% partial glycerides. As the proportion of water to oil is increased, the proportion of fatty acids to partial glycerides increases further. Since we are primarily interested in obtaining a maximum of partial glycerides and a minimum of free fatty acids, we prefer to limit the amount of water to the range of about 0.5 to 5%, based on the amount of fat. The relative proportion of fatty acids to partial glycerides will vary with any given proportion of water depending on the chemical and physical nature of the fat used in the reaction. However, in any case a high proportion of partial glycerides to fatty acids is obtained if the proportion of water is limited to the above-stated range.

During the hydrolysis reaction the mixture should be stirred gently if at all. Violent agitation should not be used as it may inactivate the lipase. A convenient and safe way of agitation is to bubble an inert gas such as nitrogen or carbon dioxide through the mixture.

The amount of lipase preparation required in the partial hydrolysis may be varied greatly since the proportion of lipase merely affects the speed of the hydrolysis but not the proportion of end products. To effect establishment of equilibrium in a relatively short time we prefer to use about 1 to 10 parts of the dry lipase powder per 1000 parts fat. Since the lipase cream is not as concentrated, one would use about 10 to about 100 parts of this preparation per 1000 parts of oil. In any case, we prefer to allow the system to come to equilibrium which takes several hours but is usually conducted longer to ensure such condition. The fact of equilibrium can be determined by titrating the free acid content from time to time and noting when it has become constant.

After the reaction has reached completion, the reaction mixture is heated in the range 100°–150° C. for a few minutes to inactivate the enzyme. The product which may be filtered while hot to remove suspended material is then ready for use.

As an alternative method of procedure particularly to decrease the proportion of fatty acids, one may add glycerol to the reaction mixture. The glycerol will react with at least part of the free fatty acids so that the end product will contain a higher proportion of partial glycerides to fatty acids than when the reaction is conducted in the absence of glycerol. The amount of glycerol to be added can be calculated by stoichiometry from the amount of free fatty acids expected to be produced in the absence of the glycerol under the conditions chosen. Usually, it is simple to add an excess, say, from about 0.1 to 1 part of glycerol per part of fat. Application of this technique is illustrated in Example V.

Partial glycerides may also be prepared by a synthesis technique starting with a fatty acid and glycerol and catalyzing the synthesis with the castor bean lipase preparations herein described. In conducting such a reaction, a fatty acid, such as capric, lauric, myristic, palmitic, stearic, arachidic, oleic, ricinoleic, etc., is mixed with the lipase preparation and into this mixture is incorporated glycerol. The reaction is allowed to take place at a temperature range from about 5° to 20° C. It is preferable to bubble a dry, inert gas such as dry nitrogen or carbon dioxide through the mixture to agitate it and also to remove the water of esterification as it is formed. By removing the water of esterification, the degree of esterification is enhanced. In this synthesis, an excess of glycerol is used thus to minimize formation of triglycerides. Thus it is preferred to employ from 1 to 4 moles of glycerol per mol of fatty acid. It is evident that instead of individual fatty acids one may use as the starting material a mixture of fatty acids as obtained by complete hydrolysis of a fat or oil. After the mixture of fatty acids, lipase and glycerol has reacted, the reaction product is heated to 100°–150° C. to inactivate the enzyme and filtered to remove inactivated enzyme and other suspended material. Any remaining excess of glycerol may be removed by evaporation under reduced pressure. Application of this synthetic technique is shown in Example VI.

The following examples demonstrate the invention in greater detail. The activity of the lipase preparations is expressed as specific lipase activity meaning the milliequivalents of acid liberated per minute per gram of the substance in question.

*Example I*

Shelled castor beans (25 g.) were ground in a mortar in the presence of 50 cc. water to form a paste. This paste was transferred to a beaker with the aid of 25 cc. of water. The resulting lipase milk was stored overnight in a covered beaker at 2°–4° C. The next day, about an equal quantity of potassium acid phthalate solution (0.2 M, pH 4.25) was added and the milk adjusted to pH 4.5 by addition of hydrochloric acid. The milk was then centrifuged, the cream being washed with distilled water and re-centrifuged. A yield of 19.9 grams of the lipase cream was obtained having a specific lipase activity of 0.55.

*Example II*

A portion of the lipase cream as prepared in Example I was frozen and subjected to vacuum until dry. The dry product was then extracted several times with petroleum ether until it was free from fat. The product had a specific lipase activity of 7.33.

*Example III*

(A) Fifty milligrams of lipase powder as prepared in Ex. II was mixed with 50 g. of olive oil and into the mixture was incorporated 1.25 g. of water with agitation. The reaction mixture was allowed to stand at about 25° C. until equilibrium was reached.

(B to E) The procedure as above described, was repeated using different amounts of water as follows: B, 1.58 g., C, 1.92 g., D, 2.25 g., E, 5.25 g.

The results obtained are tabulated below:

| Expt. | Proportion of water, percent | Proportion of products and residual oil, percent ||||
|---|---|---|---|---|---|
| | | Fatty acids | Monoglycerides | Diglycerides | Triglycerides |
| A | 2.5 | 32.2 | 11.6 | 21.5 | 34.7 |
| B | 3.16 | 37.7 | 13.2 | 19.0 | 30.1 |
| C | 3.84 | 42.2 | 13.0 | 16.3 | 28.5 |
| D | 4.5 | 46.4 | 12.1 | 18.0 | 23.5 |
| E | 10.5 | 70.0 | 5.8 | 11.8 | 12.4 |

*Example IV*

(A) One and one-half grams of lipase cream as prepared in Ex. I was incorporated with 150 g. cottonseed oil. No water was added to this reaction but note that the lipase cream furnished 0.75 g. of water. The reaction mixture was allowed to stand for several days at 21° C. until substantial equilibrium was reached.

(B–D) The procedure as above outlined was repeated but adding varying quantities of water as follows:

B, 1.2 g. (total water 1.95)
C, 3.0 g. (total water 3.75 g.)
D, 6.0 g. (total water 6.75 g.)

The results obtained are tabulated below:

| Expt. | Proportion of water, percent | Proportion of products and residual oil, percent | | | |
|---|---|---|---|---|---|
| | | Fatty acids | Mono-glycerides | Diglyc-erides | Triglyc-erides |
| A | 0.5 | 9.3 | 1.4 | 14.3 | 75.0 |
| B | 1.3 | 18.6 | 3.8 | 25.4 | 52.2 |
| C | 2.5 | 31.0 | 8.3 | 26.8 | 33.5 |
| D | 4.5 | 46.6 | 10.4 | 23.3 | 19.7 |

*Example V*

A sample of cottonseed oil (143.7 g.) was mixed with 1.5 g. lipase cream, as prepared in Ex. I, and 105.8 g. of 85% glycerol. The mixture was maintained at 10° C. for 10 days and agitated by bubbling nitrogen through the mixture. The reaction mixture was found to contain 77.7% triglycerides, 8.5% diglycerides, 6.8% monoglycerides, and 7.0% free fatty acids.

*Example VI*

150 mg. of lipase powder as prepared in Ex. II was mixed with 14.3 g. of oleic acid. Glycerol (16.8 g.) was then added and the mixture was maintained at 10° C. and agitated by bubbling dry nitrogen therethrough. Analysis of the mixture after 4.5 hours and 68 hours showed the following composition:

| Time of reaction, hrs. | Proportion of acid and esterification products, percent | | | |
|---|---|---|---|---|
| | Acid | Mono-glyceride | Diglyc-eride | Triglyc-eride |
| 4.5 | 86.0 | 5.8 | 8.0 | 0.2 |
| 68 | 34.6 | 23.8 | 27.3 | 14.3 |

Having thus described our invention, we claim:

1. A process for preparing a lipase product of high lipolytic activity which comprises grinding castor beans in water, aging the resulting ground material for at least several hours, adjusting the aged ground material to a pH in the range of 4 to 5, then centrifuging it to separate a lipase cream which exhibits a high lipolytic activity.

2. The process of claim 1 wherein the lipase cream is dried and then defatted to prepare a stable product which may be kept at room temperature for long periods of time without losing its activity.

References Cited in the file of this patent

UNITED STATES PATENTS

| Number | Name | Date |
|---|---|---|
| 1,687,050 | Yamamoto | Oct. 9, 1928 |
| 2,102,101 | Takamiya | Dec. 14, 1937 |
| 2,480,090 | Smythe et al. | Aug. 23, 1949 |
| 2,485,779 | Sanders | Oct. 25, 1949 |

OTHER REFERENCES

Vernon, Intracellular Enzymes, 1908, John Murray, London, pages 58–60.

Haley et al., "Castor Bean Lipase," Jour. Am. Chem. Soc. 43 (1921), pages 2664–2670.

Longenecker, "Ricinus Lipase, its Nature and Specificity," Jour. Am. Chem. Soc. 57, (1935), pages 2019–2021.

Ibid, "Further Studies," Jour. Am. Chem. Soc. 59 (1937), pages 2156–2161.